Sept. 25, 1962     G. D. BOYD ET AL     3,055,257
OPTICAL MASER CAVITY
Filed Oct. 7, 1960     3 Sheets-Sheet 1

INVENTORS   G. D. BOYD
               A. G. FOX
               T. LI

BY *George S. Indig*

ATTORNEY

INVENTORS G. D. BOYD
A. G. FOX
T. LI

Sept. 25, 1962     G. D. BOYD ET AL     3,055,257
OPTICAL MASER CAVITY
Filed Oct. 7, 1960     3 Sheets-Sheet 3

United States Patent Office 3,055,257
Patented Sept. 25, 1962

3,055,257
OPTICAL MASER CAVITY
Gary D. Boyd, Murray Hill, Arthur G. Fox, Rumson, and Tingye Li, Red Bank, N.J., assignors to Bell Telephone Laboratories, Incorporated, New York, N.Y., a corporation of New York
Filed Oct. 7, 1960, Ser. No. 61,205
5 Claims. (Cl. 88—1)

This invention relates to a device for generating or amplifying coherent electromagnetic radiation at high frequencies. Further, it concerns a multimode cavity designed to support radiation in the light frequency range. Such a cavity finds a variety of uses; however, this invention is primarily directed to the cavity as used in a maser oscillator or amplifier.

Maser oscillators and amplifiers have recently been considered in the optical and infrared frequency range. One of the principal problems encountered in optical masers is in obtaining a resonator or cavity which can store energy as an oscillating standing wave with a lower power loss than the power gain due to the stimulated emission from the maser material. Further, this cavity must be mode selective such that esentially one mode is efficiently supported in a standing wave, thus producing coherent stimulation of the maser material at a single frequency.

Light frequency radiation is intended to define the electromagnetic band from the farthest infrared to the ultraviolet. This encompasses a general wavelength range of from $2 \cdot 10^6$ Angstroms to 100 Angstroms.

An optical maser cavity arrangement has been disclosed by Schawlow and Townes in United States Patent No. 2,929,922, isued March 22, 1960. This design is essentially a maser material, commonly referred to as a negative temperature material, bounded by two flat parallel reflecting surfaces. Optical or infrared radiation is retained in such a cavity by multiple reflections between the parallel mirrors, thus permitting sufficient transits through the negative temperature medium to obtain stimulated amplification. The cavity resonant frequency is preferably equal to the resonant frequency of the maser material (that is, the difference in energy levels in the negative temperature medium divided by Planck's constant). This is a well-known requisite for maser action.

A typical three level maser utilizes a material in which the electrons can exist in three or more energy levels. Ordinarily the population in each level is dictated by an equilibrium condition. When such a material is "pumped" with an energy source having a frequency corresponding to the difference between the lowest and highest of the three levels under consideration, then an inverted distribution of excited states may result between two adjacent energy levels. A material existing in this state is termed a negative temperature medium. Such a material can return to its equilibrium energy state with an attendant energy release by two competing mechanisms. The material may decay or relax by a mechanism termed spontaneous emission. Because spontaneous emission is random in nature, it gives rise to unwanted noise. The preferred emission mechanism is stimulated emission which is stimulated by the coherent standing wave in the cavity. This stimulated emission is in phase with the coherent wave and is superimposed thereon, thus amplifying the standing wave. Maser oscillation occurs when the number of excited atoms is sufficiently great that the power of stimulated emission exceeds the power lost from the cavity. Consequently, the lower the cavity losses can be made, the fewer will be the number of excited atoms required to achieve the threshold condition for oscillation. A smaller number of excited atoms requires less pump power, which is desirable.

This invention is directed to an improved cavity exhibiting superior qualities over the cavity disclosed in the aforementioned United States patent in which the cavity utilizes two parallel flat reflecting surfaces. The cavity of the present invention employs two spaced reflectors wherein at least one of the reflectors is concave, the degree of curvature bearing a critical relation to the spacing of the reflection surfaces. This apparently simple, yet fundamental, change in the cavity geometry of the prior art gives rise to striking improvements. The use of a concave reflecting surface results in a cavity of lower loss while reducing the requisite size of the reflecting surfaces and providing for easy adjustment. Various other advantages will become apparent.

In the interest of simplicity and understanding, this invention will be described as a confocal cavity with spherical mirrors; that is, two spherical reflectors of equal radii spaced apart such that the two foci are coincident. Since the focal point of a spherical mirror is equal to one half the radius of curvature, spherical mirrors are confocal when spaced apart by a distance equal to their common radii of curvature. However, it will become apparent to those skilled in the art that it is not essential to have two concave reflectors in order to obtain the advantages of the confocal cavity. One plane surface and one concave surface will achieve the same end if the plane surface is properly placed. This particular arrangement offers some special advantages and is a preferred embodiment of this invention.

Also, reflectors of unequal radii of curvature when properly spaced are just as effective as reflectors having equal radii of curvature. The correct spacing separating the reflectors in every case is represented by the formula:

$$L = \frac{r_1 + r_2}{2} - \frac{\sqrt{|r_2^2 - r_1^2|}}{2} \tag{1}$$

where L is the optimum distance separating the reflectors, and $r_1$ and $r_2$ are the radii of curvature of each reflector, respectively, all lengths being in the same units. As seen in the above formula the correct spacing for reflectors of unequal radii is no longer the confocal condition that applies to equal radii reflectors.

While the foregoing discussion has consistently referred to spherical reflectors, other curved surfaces such as paraboloidal reflectors are appropriate to obtain the advantages of this invention although, in view of the relative difficulty in manufacturing such complex surfaces, spherical mirrors are preferred. Furthermore, a paraboloidal reflector possesses an axis and therefore loses the advantage of ease of alignment.

For a more thorough understanding of the foregoing discussion and the specific embodiments described hereinafter, reference is made to the drawings in which.

Figure 6:
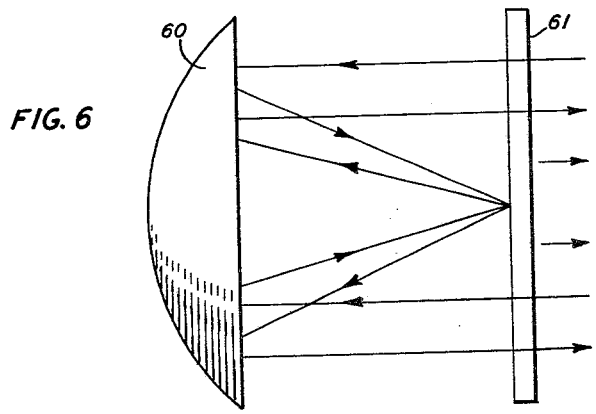
Figure 5A:
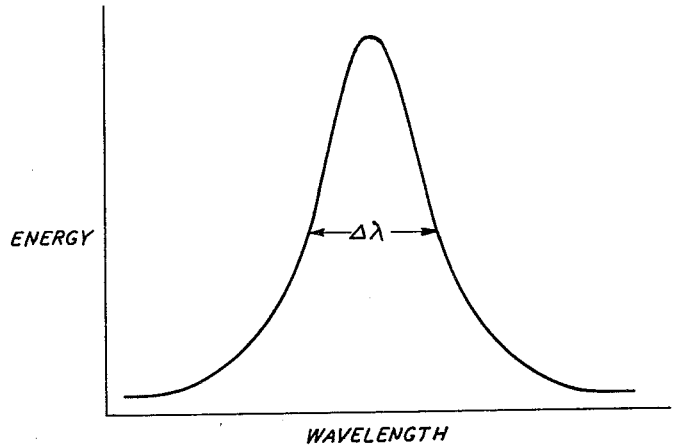
Figure 5B:
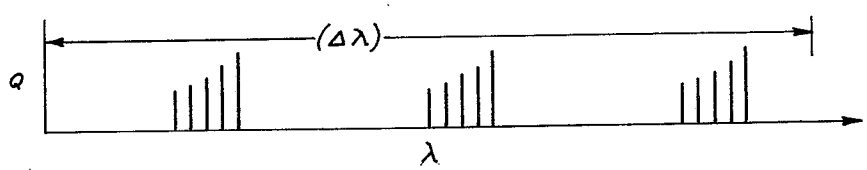
Figure 5C:
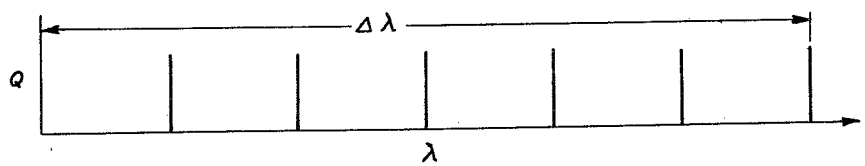

FIG. 5a, on coordinates of energy against wavelength, is a schematic plot of the linewidth of a typical maser material;

FIG. 5b, on coordinates of Q against wavelength, is a diagram of the mode spectrum associated with the plane parallel cavity;

FIG. 5c is a diagram similar to that of 5b showing the mode spectrum for the cavity of this invention; and FIG. 6 is a schematic front elevation view of a preferred cavity geometry according to this invention showing by ray optics the emerging light beam.

Figure 1A:
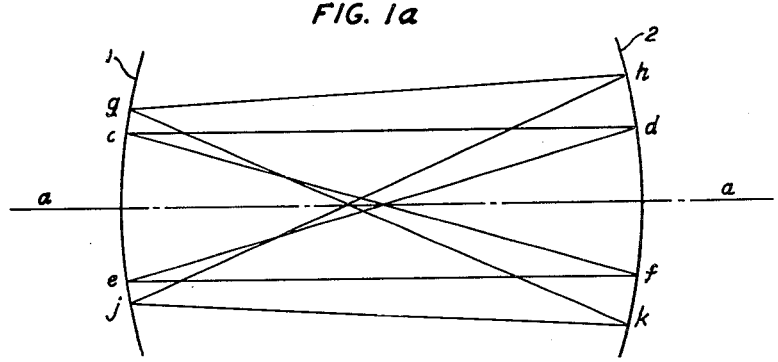
FIG. 1a is a schematic ray optics diagram showing light reflected in a cavity constructed with spherical reflectors according to this invention.
Figure 1B:
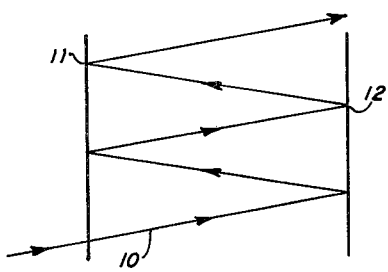
FIG. 1b is a diagram similar to that of FIG. 1a showing light reflected in a cavity utilizing plane parallel reflectors.

In FIG. 1a reflectors 1 and 2 are spaced such that their focal points coincide. From this figure it can be seen that light introduced or originating in the cavity defined by concave reflectors 1 and 2 is effectively retained in the cavity not only for rays approximately parallel to axis $a$—$a$ such as $cdef$ but also for rays at an angle with the axis such as $ghjk$. A cavity formed by two plane parallel reflectors is shown in FIG. 1b. It is seen that a ray 10 at a slight angle to the axis eventually "walks off" the flat reflectors 11 and 12 and is lost.

It is significant that by ray-optics theory all light introduced into the confocal cavity which is twice reflected is thereafter forever entrapped and theoretically experiences an infinite number of reflections, neglecting aberrations and reflection losses due to finite conductivity or transmission of the reflecting surfaces. As a practical matter, some light escapes by diffraction; however, this is a small fraction of that which is lost from the cavity with flat planar reflectors. Accordingly, it is seen that the cavity of the invention retains a greater degree of the energy introduced into it than a cavity constructed with plane parallel reflectors.

Figure 2A:
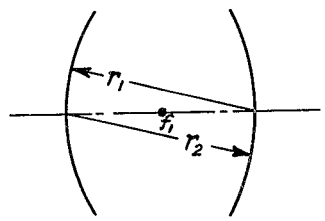
FIGS. 2a–2c are diagrams of alternative novel reflector combinations, all of which provide the advantages of the invention.
Figure 2B:
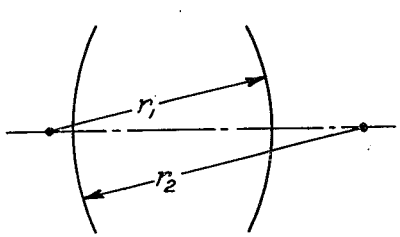
Figure 2C:
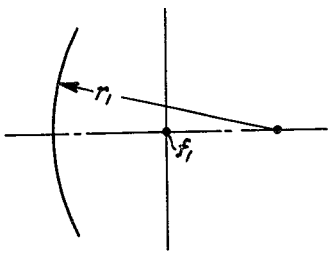
Figure 3:
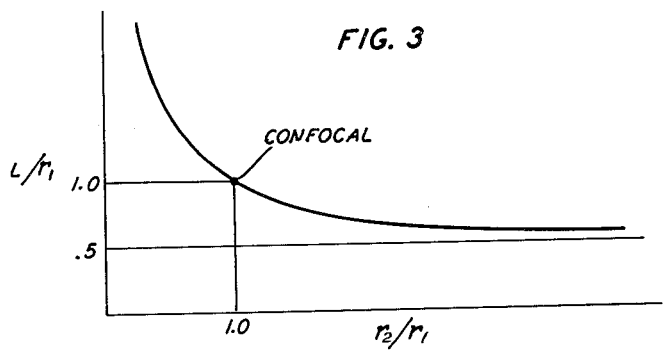
FIG. 3 is a plot of the optimum reflector spacing (normalized to the radius of curvature of one of the reflectors) versus the ratio of the radii of curvature of the two reflectors for the cavities of this invention.

FIGS. 2a–2c show various reflector combinations which provide low diffraction losses compared to the plane parallel cavity. In each case at least one concave reflector is required. The remaining reflector may be the same as the first as in FIG. 2a, or flat as in FIG. 2c, or of any degree of sphericity between these two extremes, as in FIG. 2b. As is obvious from these figures, the plate spacings vary with the degree of sphericity of the reflectors. For the confocal case of two reflectors of equal radii of curvature, as in FIG. 2a, the proper spacing is equal to twice the focal length, i.e., the radius of curvature. Because of symmetry about the focal plane, one reflector may be replaced by a plane reflector at the focal point of the curved reflector. This is equivalent to letting $r_2 = \infty$, FIG. 3 is a plot of the normalized optimum spacing as related to the ratio of curvature of the two mirrors. The ordinate is the normalized optimum spacing $L/r_1$; the abscissa is the ratio of $r_2$ to $r_1$, the radii of curvature of the two reflectors. The configuration shown in FIG. 2a, i.e., the confocal case, is designated "confocal" in the FIG. 3, and the proper spacing equals $r_1$. The other extreme corresponding to FIG. 2c is where the ratio $$\frac{r_2}{r_1}$$

is infinite and the appropriate spacing is, as seen, $$\frac{r_1}{2}$$

For the intermediate ratios of radii of curvature, as in FIG. 2b, the appropriate spacing can be taken from the curve of FIG. 3, or evaluated from Equation 1.

Figure 4B:
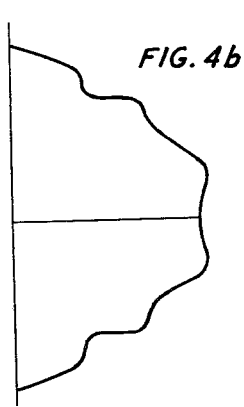
FIGS. 4a and 4b are schematic diagrams showing the energy distribution across the reflecting surface according to this invention (FIG. 4a) and the energy distribution over the surface of a parallel reflector (FIG. 4b)
Figure 4A:
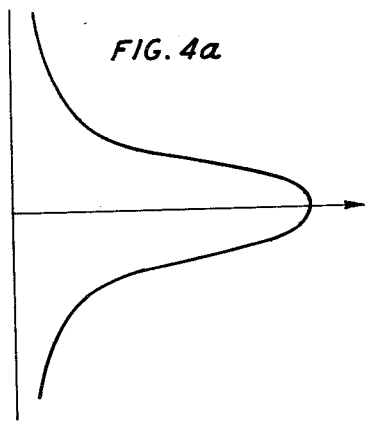

FIGS. 4a and 4b illustrate another advantage of the confocal cavity of this invention. FIG. 4a is a schematic illustration of the distribution of electromagnetic energy across one reflector in a confocal cavity. FIG. 4b is a similar illustration showing the energy distribution over the surface of a plane reflector in a cavity utilizing plane parallel reflectors. It is apparent that for a given spacing of the reflectors the energy is concentrated over a smaller area of the reflectors in the confocal cavity than the plane parallel cavity. Thus, for a given energy in the confocal cavity, the field intensity at the axis is stronger.

This high energy density obtained through the concentration of the light energy by the cavity of this invention reduces the requirements on the pump source for oscillations to occur.

It is well known to those skilled in the art that the total population difference required to achieve maser action is proportional to the volume of the electromagnetic field associated with the desired mode. In the confocal cavity the energy of a single mode is contained within a smaller volume than in a plane parallel cavity of equal Q. Therefore, the confocal cavity requires a smaller population difference. Since the total number of excited atoms is proportional to the pump power, the confocal cavity requires a smaller amount of pump power.

The preferred mode, or lowest order standing wave pattern in the cavity of the invention, is concentrated toward the center of the concave reflectors which, as stated previously, allows the use of reflectors smaller in area than those required for the prior art cavities. Reducing the size of the mirrors also serves to suppress various of the higher order, unwanted modes since diffraction losses associated with the higher order modes are greater.

A further advantage of the cavity of this invention is its ease of adjustment. The reflectors of a flat planar cavity must be absolutely parallel. A small error in adjustment results in high energy losses. There is no requirement of reflectors being parallel for the confocal cavity so long as they are spaced approximately correctly according to the relation set forth in Equation 1.

FIG. 5a is an energy spectrum of a maser material. A properly functioning cavity serves to select from this spectrum a particular wavelength for oscillation and obtain essentially the entire maser output in one preferred mode. The mode spectrums of FIGS. 5b and 5c are shown as associated with this typical frequency linewidth.

FIG. 5b shows a mode spectrum of a cavity having flat planar parallel reflectors. The ordinate is proportioned to Q ($2\pi$ times the ratio of energy stored to energy lost per cycle of oscillation). The abscissa is plotted as wavelength as in FIG. 5a. FIG. 5c is the same type of plot as that of FIG. 5b showing the mode spectrum prevailing in a cavity according to this invention. As is seen, each low order mode in the cavity employing plane, parallel reflectors, has associated therewith a number of higher order modes having diminishing Q values. Whereas a large portion of the energy within the maser material linewidth will appear in the lowest order mode, some of the energy will also appear in nearby modes thus interfering with proper mode selection. Also, the oscillating frequency could vary from the lowest order mode to one of the higher order modes associated with it thus producing frequency instability. In the mode spectrum of the cavity according to this invention the higher order, unwanted modes, which appear in FIG. 5b, are degenerate and occur at the same resonant frequency. Accordingly, single frequency operation is more easily obtained and, once obtained, is more stable than in the cavity of the prior art. It is seen that more low order modes exist over a given bandwidth in a cavity of this invention than in that employing flat, parallel reflectors; however, the fact that each is discrete and well separated from the others is of primary importance.

FIG. 6 shows a preferred embodiment of this invention. According to this embodiment, concave reflector 60 is used in combination with a flat, planar reflector 61 placed at the focal length of the concave reflector. Flat, planar reflector 61 preferably allows greater transmission than concave reflector 60 so the concave reflector should be as nearly perfect a reflector as possible. This allows most of the maser output to emerge through the flat reflector, thus eliminating the bending of the light rays by a curved dielectric interface.

The cavity of this invention may be used in conjunction with any known negative temperature materials. A gas emission medium may be employed, such as the potassium vapor of United State Patent 2,929,922 or, for a solid state device, ruby is appropriate. Vapors of the alkali metals and various rare earth salts such as europium chloride or samarium chloride may be used. The pump energy may be any high frequency energy source having a wavelength approximately equal to that of the pump transition.

The nature of the reflecting surfaces is not a critical feature of this invention. The reflectors may be mirrors of vapor-deposited metallic films. In the interest of obtaining high reflectivity and thus providing greater cavity efficiency, multiple dielectric layered reflectors, which may provide for reflection coefficients in excess of .95 and preferably in excess of .98 are preferred. The coherent light generated or amplified in the cavity is transmitted through the reflectors. Typically such reflectors are designed to transmit approximately one percent of the incident light. Alternatively the output power can be obtained from the side as diffraction losses.

Various other arrangements and modifications will be apparent to those skilled in the art and are still considered as within the scope of this invention as defined in the appended claims.

What is claimed is:

1. An optical or infrared maser cavity comprising two concave reflectors aligned facing one another and spaced apart by a distance given by the relation:

$$L = \frac{r_2 + r_1}{2} - \frac{\sqrt{|r_2^2 - r_1^2|}}{2}$$

where L is the spacing, $r_1$ and $r_2$ are the radii of curvature of each reflector, respectively, and L, $r_1$, and $r_2$ are in equal units of length, and a negative temperature medium disposed between said reflectors such that light frequency radiation obtained in the cavity is reflected through said negative temperature medium and means for extracting a portion of said reflected radiation from said cavity.

2. The device of claim 1 wherein both reflectors have the same degree of curvature, the reflectors further being spaced apart by a distance approximately equal to their common radius of curvature.

3. The device of claim 2 wherein the reflectors provide at least 98% reflectivity.

4. An optical or infrared maser cavity comprising a concave reflector and a planar reflector, the distance separating the reflectors being approximately equal to the focal length of the concave reflector and a negative temperature medium disposed between said reflectors such that light frequency radiation obtained in the cavity is reflected through said negative temperature medium and means for extracting a portion of said reflected radiation from said cavity.

5. The device of claim 4 wherein the flat reflector has a higher transmission coefficient than the concave reflector.

References Cited in the file of this patent

UNITED STATES PATENTS

| | | |
|---|---|---|
| 2,563,780 | Fontaine | Aug. 7, 1951 |
| 2,628,533 | Oetjen | Feb. 17, 1953 |
| 2,929,922 | Schawlow et al. | Mar. 22, 1960 |